(12) United States Patent
Sasaki et al.

(10) Patent No.: US 9,916,659 B2
(45) Date of Patent: Mar. 13, 2018

(54) OPERATING DEVICE, OPERATING METHOD, AND PROGRAM THEREFOR

(71) Applicant: KABUSHIKI KAISHA TOPCON, Itabashi-ku (JP)

(72) Inventors: You Sasaki, Itabashi-ku (JP); Tadayuki Ito, Itabashi-ku (JP)

(73) Assignee: KABUSHIKI KAISHA TOPCON, Itabashi-ku (JP)

( * ) Notice: Subject to any disclaimer, the term of this patent is extended or adjusted under 35 U.S.C. 154(b) by 224 days.

(21) Appl. No.: 14/834,633

(22) Filed: Aug. 25, 2015

(65) Prior Publication Data
US 2016/0063703 A1 Mar. 3, 2016

(30) Foreign Application Priority Data

Aug. 28, 2014 (JP) .................................. 2014-173908

(51) Int. Cl.
*G06T 7/00* (2017.01)
*G01C 11/02* (2006.01)
(Continued)

(52) U.S. Cl.
CPC ............ *G06T 7/0018* (2013.01); *G01C 11/02* (2013.01); *G01S 19/49* (2013.01); *G06K 9/0063* (2013.01); *G06K 9/00637* (2013.01); *G06K 9/6211* (2013.01); *G06T 3/40* (2013.01); *G06T 7/20* (2013.01); *G06T 7/85* (2017.01);
(Continued)

(58) Field of Classification Search
CPC ........... G06T 7/0018; G06T 7/85; G06T 7/20; G06T 3/40; G06T 2207/30252; G06T 2207/10021; G06T 2207/30204; H04N 5/247; H04N 5/2356; G01S 19/49; G06K 9/0063; G01C 11/02
See application file for complete search history.

(56) References Cited

U.S. PATENT DOCUMENTS

| 2008/0181488 A1* | 7/2008 | Ishii | .......................... B60R 1/00 |
| | | | 382/154 |
| 2014/0139674 A1* | 5/2014 | Aoki | .......................... G06T 7/85 |
| | | | 348/148 |

FOREIGN PATENT DOCUMENTS

JP    2013-40886    2/2013

OTHER PUBLICATIONS

Extended European Search Report dated Feb. 3, 2016 in Patent Application 15181706.1.
(Continued)

*Primary Examiner* — Tung Vo
*Assistant Examiner* — Joseph Becker
(74) *Attorney, Agent, or Firm* — Oblon, McClelland, Maier & Neustadt, L.L.P.

(57) ABSTRACT

Exterior orientation parameters of a camera are easily determined by, for example, a reference image being obtained by photographing a building 131 with a camera 112, in which exterior orientation parameters are determined, while a vehicle 100 travels, and a comparative image being simultaneously obtained by photographing the building 131 with a camera 113, in which exterior orientation parameters are undetermined. Then, points that match between the reference image and the comparative image are selected, and relative orientation and scale adjustment using a predetermined scale are performed, whereby the exterior orientation parameters of the camera 113 are calculated.

2 Claims, 6 Drawing Sheets

(51) Int. Cl.
  *G06K 9/00*   (2006.01)
  *G06T 3/40*   (2006.01)
  *G06T 7/20*   (2017.01)
  *H04N 5/235*  (2006.01)
  *G01S 19/49*  (2010.01)
  *H04N 5/247*  (2006.01)
  *G06T 7/80*   (2017.01)
  *G06K 9/62*   (2006.01)

(52) U.S. Cl.
  CPC ........... *H04N 5/2356* (2013.01); *H04N 5/247* (2013.01); *G06T 2207/10021* (2013.01); *G06T 2207/30204* (2013.01); *G06T 2207/30252* (2013.01)

(56) References Cited

OTHER PUBLICATIONS

U.S. Appl. No. 14/834,657, filed Aug. 25, 2015, Sasaki, et al.
U.S. Appl. No. 14/834,553, filed Aug. 25, 2015, Sasaki, et al.
U.S. Appl. No. 14/834,298, filed Sep. 2, 2015, Sasaki, et al.

* cited by examiner

Reference image obtained at time $t_1$

Comparative image obtained at time $t_1$

Reference image obtained at time $t_2$

Comparative image obtained at time $t_2$

Reference image obtained at time $t_3$

Comparative image obtained at time $t_3$

Superposed reference image

Superposed comparative image

Fig. 7A

Reference image obtained at time $t_1$, with selected matched points

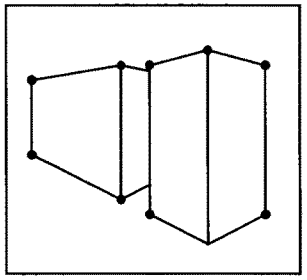

Comparative image obtained at time $t_1$, with selected matched points

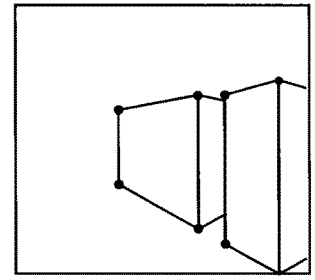

Fig. 7B

Reference image obtained at time $t_2$, with selected matched points

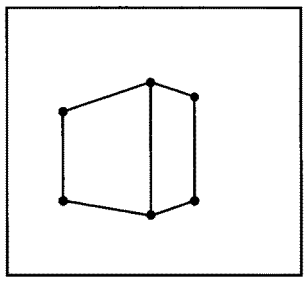

Comparative image obtained at time $t_2$, with selected matched points

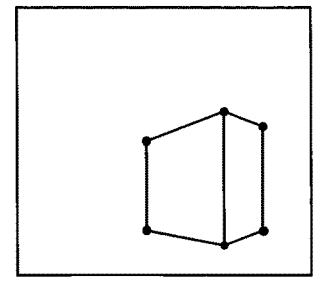

Fig. 7C

Reference image obtained at time $t_3$, with selected matched points

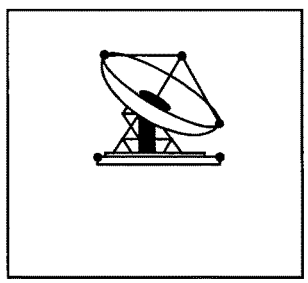

Comparative image obtained at time $t_3$, with selected matched points

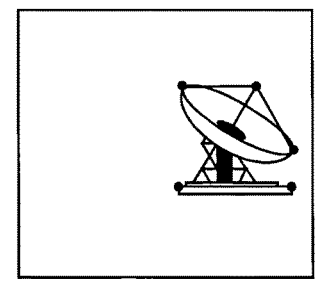

Fig. 7D

Data of superposed matched points based on multiple reference images with selected matched points

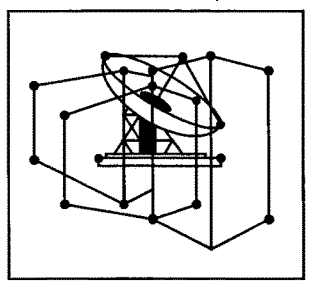

Data of superposed matched points based on multiple comparative images with selected matched points

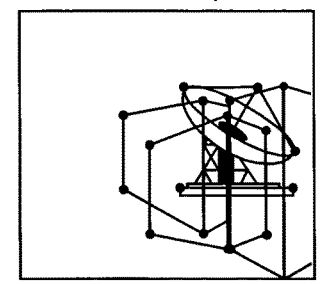

OPERATING DEVICE, OPERATING METHOD, AND PROGRAM THEREFOR

BACKGROUND OF THE INVENTION

Technical Field

The present invention relates to a technique for determining the position and the attitude of an optical device.

Background Art

Techniques for obtaining spatial information for maps and the like are publicly known, as disclosed in, for example, Japanese Unexamined Patent Application Laid-Open No. 2013-40886. In this technique, while a vehicle, which is equipped with an IMU (Inertial Measurement Unit) and an optical device such as a camera and a laser scanner, travels, the location of the vehicle is measured by the IMU, and the surrounding conditions of the vehicle are simultaneously measured by the optical device.

In this technique, exterior orientation parameters (position and attitude) of the camera in a coordinate system, which is set in a system, must be known in advance. In general, an IMU, a camera, a laser scanner, and the like, are preinstalled in a factory, and procedures (calibration) for determining the exterior orientation parameters are performed at that time. However, there may be cases in which a user desires to set or change the position and the attitude of the camera. In such cases, the calibration should be performed after the fixing of the camera to the vehicle is completed.

SUMMARY OF THE INVENTION

However, typical procedures for the calibration are complicated and impose a heavy burden on a user. In view of these circumstances, an object of the present invention is to provide a technique for determining exterior orientation parameters of a camera by a simple procedure.

A first aspect of the present invention provides an operating device including an image obtaining circuit having a structure that obtains a reference image and a comparative image, a matched point selecting circuit having a structure that selects points that match between the reference image and the comparative image, and an exterior orientation parameter calculating circuit. The reference image is obtained by photographing an object with a first camera while a vehicle travels, and the first camera is fixed to the vehicle and has exterior orientation parameters with respect to the vehicle, which are determined. The comparative image is obtained by photographing the object with a second camera at the same time as the first camera while the vehicle travels, and the second camera is fixed to the vehicle and has exterior orientation parameters with respect to the vehicle, which are undetermined. The exterior orientation parameter calculating circuit has a structure that performs relative orientation based on the matched points between the reference image and the comparative image and that calculates the exterior orientation parameters of the second camera by adjusting a scale in accordance with a predetermined scale.

According to a second aspect of the present invention, in the first aspect of the present invention, the reference image and the comparative image may be simultaneously photographed at multiple timings, and the operating device may further include a superposition processing circuit. The superposition processing circuit has a structure that generates a superposed reference image by superposing multiple reference images photographed at multiple timings and that generates a superposed comparative image by superposing multiple comparative images photographed at the multiple timings. In this case, the matched point selecting circuit selects points that match between the superposed reference image and the superposed comparative image. The exterior orientation parameter calculating circuit performs relative orientation based on the matched points between the superposed reference image and the superposed comparative image and calculates the exterior orientation parameters of the second camera by adjusting the scale with the predetermined scale.

According to a third aspect of the present invention, in the first aspect of the present invention, the reference image and the comparative image may be simultaneously photographed at multiple timings, the matched point selecting circuit may have a structure that selects points that match between the reference image and the comparative image, which are simultaneously photographed, and the operating device may further include a superposition processing circuit. The superposition processing circuit has a structure that obtains data of superposed matched points by superposing data of the matched points between the reference images and the comparative images, which are simultaneously photographed at the multiple timings. In this case, the exterior orientation parameter calculating circuit performs relative orientation based on the data of the superposed matched points and calculates the exterior orientation parameters of the second camera by adjusting the scale with the predetermined scale.

According to a fourth aspect of the present invention, in the second or the third aspect of the present invention, the multiple reference images may be obtained by photographing different objects.

A fifth aspect of the present invention provides an operating method including obtaining a reference image and a comparative image, selecting matched points between the reference image and the comparative image, performing relative orientation based on the matched points between the reference image and the comparative image, and calculating exterior orientation parameters. The reference image is obtained by photographing an object with a first camera while a vehicle travels, and the first camera is fixed to the vehicle and has exterior orientation parameters with respect to the vehicle, which are determined. The comparative image is obtained by photographing the object with a second camera at the same time as the first camera while the vehicle travels, and the second camera is fixed to the vehicle and has exterior orientation parameters with respect to the vehicle, which are undetermined. In the above method, the exterior orientation parameters of the second camera are calculated by adjusting a scale in accordance with a predetermined scale.

A sixth aspect of the present invention provides a recording medium in which a program read and executed by a computer is stored. The program allows the computer to obtain a reference image and a comparative image, select points that match between the reference image and the comparative image, perform relative orientation based on matched points between the reference image and the comparative image, and calculate exterior orientation parameters of a second camera by adjusting a scale in accordance with a predetermined scale. The reference image is obtained by photographing an object with a first camera while a vehicle travels, and the first camera is fixed to the vehicle and has exterior orientation parameters with respect to the vehicle, which are determined. The comparative image is obtained by photographing the object with the second camera at the same time as the first camera while the vehicle travels, and the second camera is fixed to the vehicle and has exterior orientation parameters with respect to the vehicle, which are undetermined.

According to the present invention, the exterior orientation parameters of a camera can be determined by a simple procedure.

BRIEF DESCRIPTION OF DRAWINGS

FIGS. 7A to 7D are line drawings showing selected matched points.

PREFERRED EMBODIMENTS OF THE INVENTION

1. First Embodiment

Structure

Figure 1:
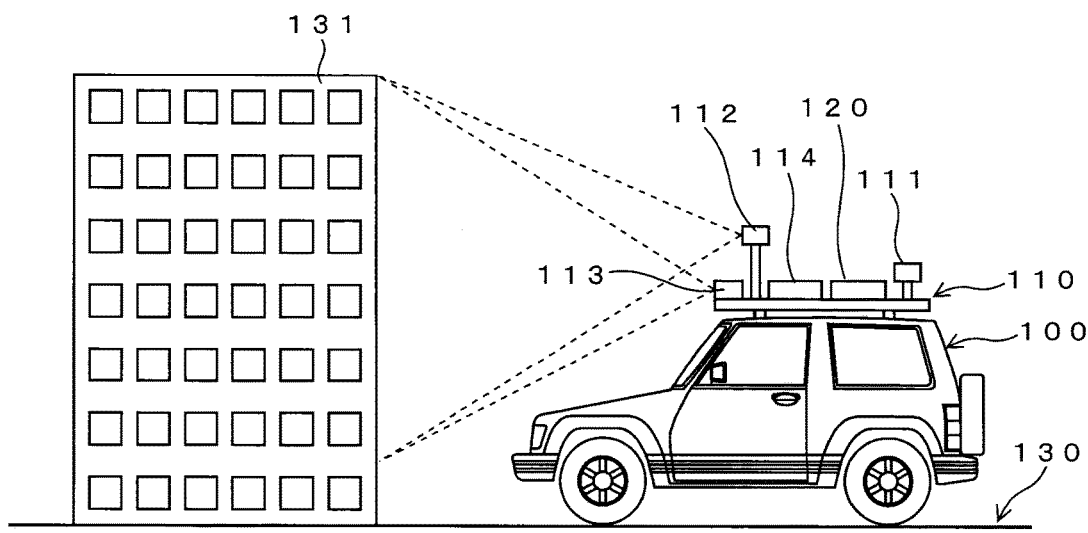
FIG. 1 is a conceptual diagram of an embodiment.

FIG. 1 shows a conceptual diagram of an embodiment. FIG. 1 shows a vehicle 100 mounted with a measuring system 110. The measuring system 110 has a base on which a GNSS unit 111, an operating part 120, a camera 112, a camera 113, and an IMU 114 are mounted.

The GNSS unit 111 receives navigation signals from a navigation satellite forming a GNSS (Global Navigation Satellite System) and outputs its location information and time information, which is calibrated and has high precision. The operating part 120 has a calculation function, described later.

The camera 112 is a reference camera, and it is fixed in a predetermined direction and photographs moving images. Naturally, the camera 112 can also photograph still images. The camera 112 is fixed to the vehicle 100 (IMU 114), and exterior orientation parameters thereof with respect to the vehicle 100 (IMU 114) are determined in advance. As the camera 112, a panoramic camera, which can photograph conditions in 360 degrees, or a wide-angle camera, which can photograph over a wide angle range, may be used.

The IMU 114 is an inertial measurement unit, and it detects acceleration and measures change of location and attitude. The IMU 114 is fixed to the vehicle 100, and the position and the attitude thereof with respect to the vehicle 100 are determined in advance. The IMU 114 is preliminarily calibrated based on a ground coordinate system. The ground coordinate system is an absolute coordinate system fixed relative to the ground and is a three-dimensional orthogonal coordinate system that describes the location on the ground, which is measured by the GNSS unit 111. Moreover, the IMU 114 is calibrated at predetermined timing based on the location information and the time information, which are obtained from the GNSS unit 111.

The camera 113 is a camera in which exterior orientation parameters are to be determined. The camera 113 is capable of photographing moving images and still images and is mounted to the vehicle 100 at a position freely selected by a user. The camera 113 is arranged on the base of the measuring system 110 in this example, but it can be mounted at another location of the vehicle 100. However, the camera 113 must be arranged at a position in a particular attitude so as to be able to photograph the same object as the camera 112.

The distance between the cameras 112 and 113 must be known in advance in order to perform scale adjustment with a predetermined scale, described later. Therefore, a user needs to select the arranging position of the camera 113 from multiple positions, at which the distance between the cameras 112 and 113 is known, or measure the distance between the cameras 112 and 113 after the camera 113 is arranged. Alternatively, in a processing of selecting multiple matched points between the images that are simultaneously photographed by the cameras 112 and 113 (described later), if at least one distance among the multiple matched points in the images is known (for example, each end of a scale with a known distance is selected as a matched point), the scale adjustment can be performed by using this known distance between the matched points. In this case, accordingly, the distance between the cameras 112 and 113 need not be known.

The operating part 120, the camera 112, the camera 113, and the IMU 114 are provided with a synchronizing signal using GNSS from the GNSS unit 111, and they can operate synchronously. Alternatively, a device for generating a synchronizing signal may be provided, and each part can be synchronously operated based on this synchronizing signal from the device. Although not shown in the figures, the operating part 120 has a function for obtaining three-dimensional data of the surrounding environment where the vehicle 100 has traveled, based on the image data, etc. By using the three-dimensional data, a three-dimensional model of the conditions through which the vehicle 100 has traveled can be generated.

Figure 2:
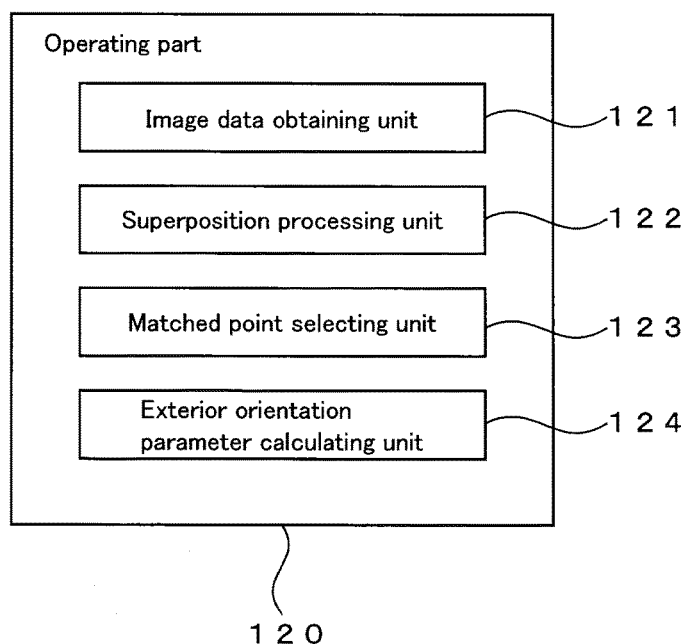
FIG. 2 is a block diagram of an operating part.

The operating part 120 is hardware that functions as a computer and includes a CPU, a memory, a variety of interfaces, and other necessary electronic circuits. The operating part 120 can be understood to be hardware including each functioning unit shown in FIG. 2. Each of the functioning units shown in FIG. 2 may be constructed of software, or one or multiple functioning units may be constructed of dedicated hardware. Programs for executing the function of the operating part 120 are stored in the memory of the operating part 120. This memory also stores data relating to the exterior orientation parameters and the like of the camera 112, etc., which are obtained in advance. It should be noted that the program for executing the operating part 120 may be stored in external storage media and be provided therefrom. Moreover, each of the functioning units shown in FIG. 2 may be constructed of a dedicated operational circuit. The functioning unit constructed of software and the functioning unit constructed of a dedicated operational circuit may be used together. For example, each of the functioning units can be formed of an electronic circuit such as a CPU (Central Processing Unit), an ASIC (Application Specific Integrated Circuit), a PLD (Programmable Logic Device) such as a FPGA (Field Programmable Gate Array), or the like.

The operating part 120 includes an image data obtaining unit 121, a superposition processing unit 122, a matched point selecting unit 123, and an exterior orientation parameter calculating unit 124. The image data obtaining unit 121 obtains data of images from the cameras 112 and 113.

The superposition processing unit 122 performs processing for obtaining a superposed reference image by superposing multiple images, which are photographed by the camera 112 at multiple timings, and processing of obtaining a superposed comparative image by superposing multiple images, which are photographed by the camera 113 at the multiple timings. FIGS. 3A to 3D show examples of three reference images photographed by the camera 112 at times $t_1$, $t_2$, and $t_3$, a superposed reference image obtained by superposing the three reference images, three comparative images photographed by the camera 113 at the times $t_1$, $t_2$, and $t_3$, and a superposed comparative image obtained by superposing the three comparative images. Here, the cameras 112 and 113 took photographs at the same timings. The reference images (photographed by the camera 112) and the comparative images (photographed by the camera 113) differ slightly in view, even though the same objects were photographed, because the viewing positions of the cameras 112 and 113 differ from each other.

The matched point selecting unit 123 selects common feature points (matched points) between the image photographed by the camera 112 and the image photographed by the camera 113. In this example, common feature points between the superposed reference image and the superposed comparative image are selected as the matched points. The selection of the common feature points can be performed by a user or can be automatically performed by software processing.

The exterior orientation parameter calculating unit 124 performs relative orientation based on the images photographed by the cameras 112 and 113 and calculates the exterior orientation parameters of the camera 113 by adjusting the scale with a predetermined scale. In this example, the exterior orientation parameters of the camera 113 are calculated by performing relative orientation based on the superposed reference image and the superposed comparative image and by adjusting the scale with a predetermined scale.

Processing Example

Figure 4:
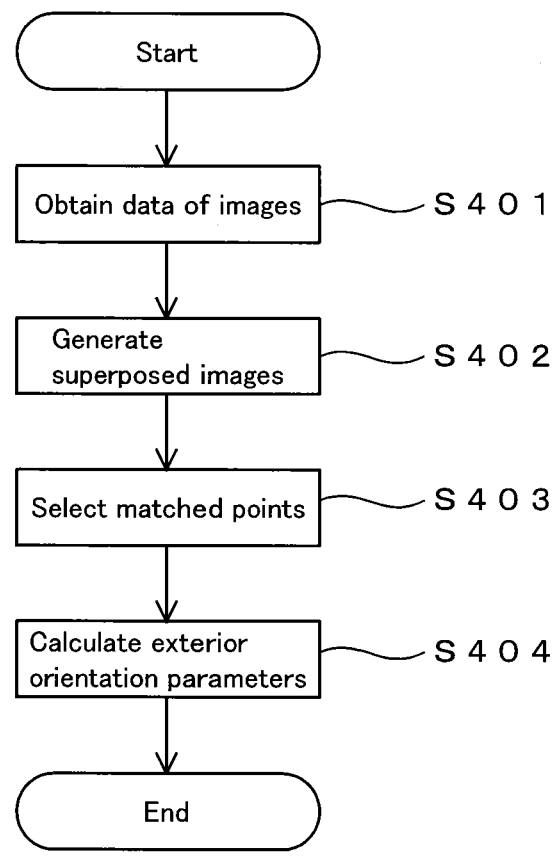
FIG. 4 is a flow chart showing an example of a processing procedure.

FIG. 4 is a flow chart showing an example of a processing procedure. First, the vehicle 100 is started to travel in an appropriate environment (for example, on a road surface 130), and at the same time, objects, such as a building 131, are photographed by the cameras 112 and 113 at multiple timings. The photographing is performed by synchronizing the cameras 112 and 113 so that the same objects are contained in the photographing visual field of the cameras 112 and 113. In addition, the photographing should be performed so that different images are photographed at different timings. For example, moving images are photographed by synchronizing the two cameras, and data of multiple synchronized frame images are obtained.

FIGS. 3A to 3D show an example of a case in which the cameras 112 and 113 simultaneously took photographs at the times $t_1$, $t_2$, and $t_3$. Here, the images photographed by the camera 112 are called "reference images", and the images photographed by the camera 113 are called "comparative images".

Figure 3A:
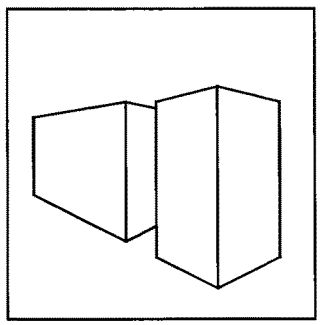
FIGS. 3A to 3D are line drawings of photographed images.
Figure 3A:
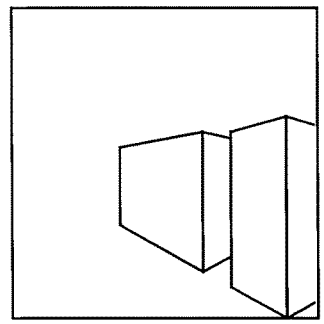
Figure 3B:
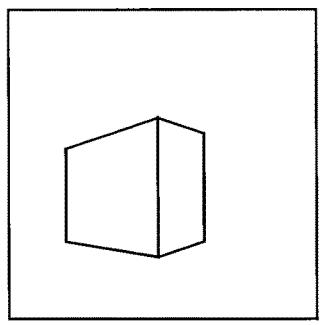
Figure 3B:
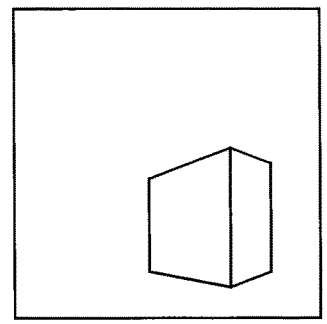
Figure 3C:
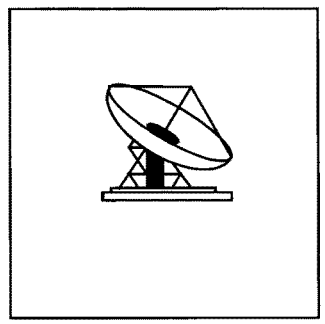
Figure 3C:
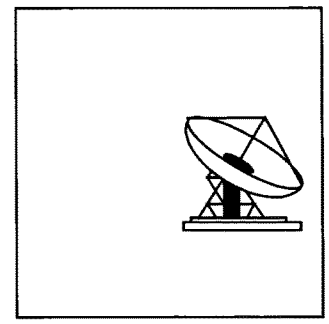
Figure 3D:
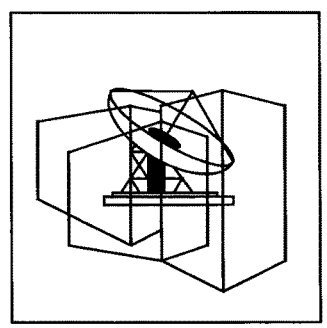
Figure 3D:
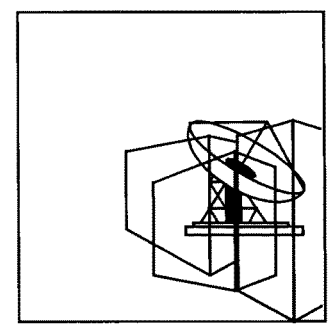

The data of the reference images photographed by the camera 112 and the data of the comparative images photographed by the camera 113 are obtained by the image data obtaining unit 121 and are taken in the operating part 120 (Step S401). After the image data are obtained, the reference images photographed at multiple timings are superposed, whereby a superposed reference image is obtained. In addition, the comparative images photographed at the multiple timings are superposed, whereby a superposed comparative image is obtained (Step S402). That is, the reference images photographed by the camera 112 at the times $t_1$, $t_2$, and $t_3$ are superposed, whereby the superposed reference image is obtained. Similarly, the comparative images photographed by the camera 113 at the times $t_1$, $t_2$, and $t_3$ are superposed, whereby the superposed comparative image is obtained. This processing is performed by the superposition processing unit 122. FIG. 3D shows examples of the superposed reference image and the superposed comparative image.

After the superposed reference image and the superposed comparative image are obtained, points that match between the two images are selected (Step S403). This processing is performed by the matched point selecting unit 123. In a case of selecting the matched points by a user, for example, the following processing is performed. First, the superposed reference image is shown on a left half side of a display of a terminal (not shown in the figures), and the superposed comparative image is shown on a right half side of the display. The user can select matched points (common feature points) by comparing the images on the right and left side and by operating a GUI (Graphical User Interface) included in the terminal. In this case, the matched points selected by the user are accepted by the matched point selecting unit 123. Here, at least six points are selected as the matched points.

Figure 5:
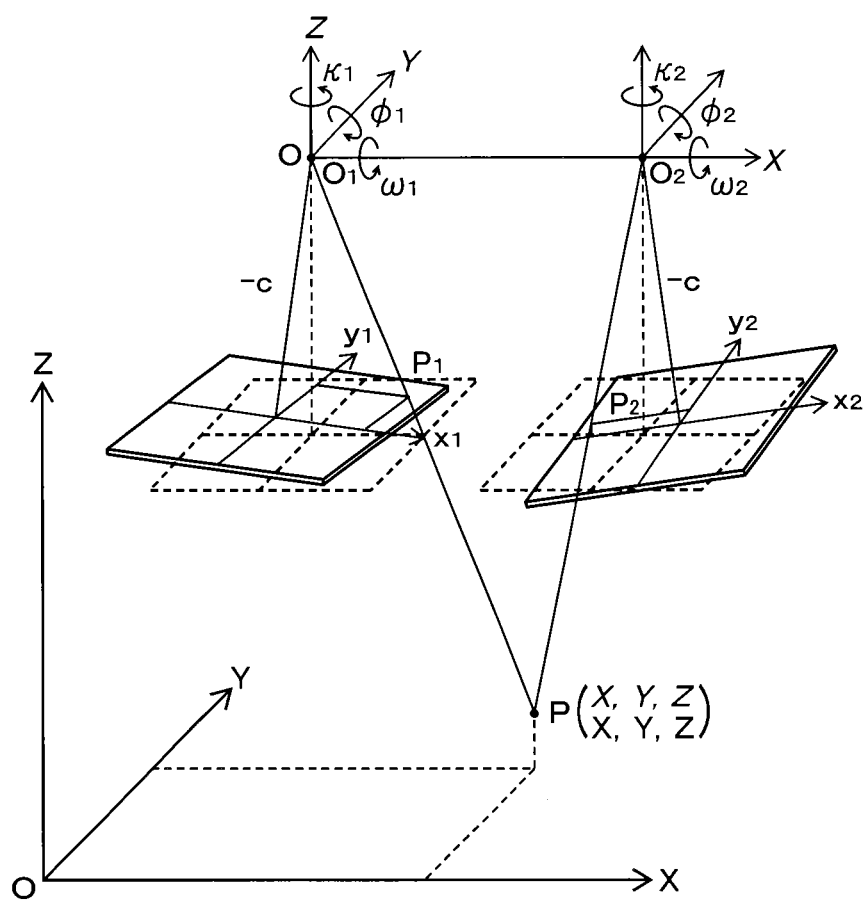
FIG. 5 is an explanatory diagram for showing the principle of relative orientation.

After the matched points are selected, exterior orientation parameters of the camera 113 are calculated by performing relative orientation and by adjusting the scale with a predetermined scale (Step S404). This processing is performed by the exterior orientation parameter calculating unit 124. FIG. 5 is an explanatory drawing for explaining the principle of the relative orientation. In the processing of the relative orientation, at least six points (orientation parameters: pass points) are selected among the above matched points and correspond between the right and the left images, whereby a stereo model is generated. By obtaining the stereo model, the relative relationships of the position and the attitude between the two cameras, by which the right and the left images are obtained, are determined.

In the processing of the relative orientation, a coplanar condition such that two light beams connecting a projection center $O_1$ or $O_2$ and an object point P must be on the same plane is used. The coplanar condition formula is expressed by the First Formula. Here, for example, the left image is the superposed reference image, and the right image is the superposed comparative image.

$$\begin{vmatrix} X_{01} & Y_{01} & Z_{01} & 1 \\ X_{02} & Y_{02} & Z_{02} & 1 \\ X_1 & Y_1 & Z_1 & 1 \\ X_2 & Y_2 & Z_2 & 1 \end{vmatrix} = 0 \quad \text{First Formula}$$

$X_{01}, Y_{01}, Z_{01}$: Coordinates of projection center of the left image $X_{02}, Y_{02}, Z_{02}$: Coordinates of projection center of the right image $X_1, Y_1, Z_1$: Left image coordinates $X_2, Y_2, Z_2$: Right image coordinates As shown in FIG. 5, an origin point of a model coordinate system is assumed to be a projection center $O_1$ in the left image, and a line connecting to a projection center $O_2$ in the right image is assumed to be an X-axis. In scale, the length of the baseline (distance between projection centers of the two cameras) is assumed to be a unit length. In this case, five parameters of rotation angles, a rotation angle $\kappa_1$ of the Z-axis and a rotation angle $\phi_1$ of the Y-axis of the camera for the left image, and a rotation angle $\kappa_2$ of the Z-axis, a rotation angle $\phi_2$ of the Y-axis, and a rotation angle $\omega_2$ of the X-axis of the camera for the right image, are used. Since a rotation angle $\omega_1$ of the X-axis of the camera for the left image is zero, it need not be taken into consideration. Under these conditions, the coplanar condition formula of the First Formula is converted into the Second Formula, and respective parameters are calculated by solving the Second Formula.

$$F(\kappa_1, \phi_1, \kappa_2, \phi_2, \omega_2) = \begin{vmatrix} Y_1 & Z_1 \\ Y_2 & Z_2 \end{vmatrix} = Y_1 Z_2 - Y_2 Z_2 = 0 \quad \text{Second Formula}$$

$\kappa_1$: Rotation angle about Z-axis of the camera for the left image
$\phi_1$: Rotation angle about Y-axis of the camera for the left image
$\kappa_2$: Rotation angle about Z-axis of the camera for the right image
$\phi_2$: Rotation angle about Y-axis of the camera for the right image
$\omega_2$: Rotation angle about X-axis of the camera for the right image Here, the following Third Formula of a coordinate conversion relationship formula is established between the model coordinate system XYZ and the camera coordinate system xyc.

$$\begin{pmatrix} X_1 \\ Y_1 \\ Z_1 \end{pmatrix} = \begin{pmatrix} \cos\phi_1 & 0 & \sin\phi_1 \\ 0 & 1 & 0 \\ -\sin\phi_1 & 0 & \cos\phi_1 \end{pmatrix} \begin{pmatrix} \cos\kappa_1 & -\sin\kappa_1 & 0 \\ \sin\kappa_1 & \cos\kappa_1 & 0 \\ 0 & 0 & 1 \end{pmatrix} \begin{pmatrix} x_1 \\ y_1 \\ -c \end{pmatrix} = 0 \quad \text{Third Formula}$$

$$\begin{pmatrix} X_2 \\ Y_2 \\ Z_2 \end{pmatrix} = \begin{pmatrix} 1 & 0 & 0 \\ 0 & \cos\omega_2 & -\sin\omega_2 \\ 0 & \sin\omega_2 & \cos\omega_2 \end{pmatrix} \begin{pmatrix} \cos\phi_2 & 0 & \sin\phi_2 \\ 0 & 1 & 0 \\ -\sin\phi_2 & 0 & \cos\phi_2 \end{pmatrix} \begin{pmatrix} \cos\kappa_2 & -\sin\kappa_2 & 0 \\ \sin\kappa_2 & \cos\kappa_2 & 0 \\ 0 & 0 & 1 \end{pmatrix} \begin{pmatrix} x_2 \\ y_2 \\ -c \end{pmatrix} + \begin{pmatrix} 1 \\ 0 \\ 0 \end{pmatrix}$$

Unknown parameters (relative orientation parameters) are calculated by the following steps using the above formulas.
(1) Assume initial approximate values of the unknown parameters ($\kappa_1$, $\phi_1$, $\kappa_2$, $\phi_2$, $\omega_2$) to be zero as a rule.
(2) Expand the coplanar condition formula of the First Formula using Taylor expansion about the approximate values, and make it linear. Calculate the differential coefficients from the Second Formula, and make observation formulas.
(3) Calculate correction amount for the approximate values by the least-squares method.
(4) Correct the approximate values.
(5) Use the corrected approximate values, and repeat the steps (1) to (4) until the result converges.

The scale is adjusted by applying a predetermined scale to the above calculations, and a relative relationship of the exterior orientation parameters between the camera for the left image (corresponding to the camera 112) and the camera for the right image (corresponding to the camera 113) is determined. In the calculations of the relative orientation described above, since the length of the baseline (distance between projection centers of the two cameras) is assumed as a unit length, the scale of the stereo model may be freely selected. Accordingly, by providing a predetermined scale, the scale can be made to correspond to the sizes of the actual objects. This processing is the scale adjustment. In this example, the distance between the cameras 112 and 113 (value of the length of the baseline) is used as the predetermined scale. Alternatively, a distance between different matched points may be used as the predetermined scale. In this case, the photographing is performed so that two points, in which the distance therebetween is known, appear in the same image, and these two points are selected as matched points and are used as the predetermined scale. For example, an object of known length is photographed by the cameras 112 and 113, and both ends of the object are selected as the matched points, whereby the distance between the matched points at the ends is used as the predetermined scale.

Since the exterior orientation parameters of the camera for the left image, corresponding to the camera 112, with respect to the IMU 114 are known, the exterior orientation parameters of the camera 113 with respect to the IMU 114 are calculated from the relationship of the exterior orientation parameters between the cameras 112 and 113 determined by the above calculations.

According to the above technique, the common object is photographed by the cameras 112 and 113 by synchronizing them while the vehicle 100 travels, and the relative orientation based on the photographed images and the scale adjustment using a predetermined scale are performed, whereby the exterior orientation parameters of the camera 113 are calculated. In the above example, multiple images are obtained while the vehicle 100 travels, and the images are superposed one on the other, whereby the feature points are made prominent, and the precision of the relative orientation is increased. Moreover, different images are obtained at different timings while the vehicle travels, and the matched points are obtained from the different images that are superposed, whereby the distances from each camera to the matched points vary, and the margin of error is reduced.

In a case of selecting the matched points by software processing, calibration can be performed by the above processing while the vehicle 100 travels, and then measurement using the camera 113 can be performed directly. For example, after the camera 113 is mounted on the vehicle 100, the vehicle 100 is started to travel so that photographing is performed for calibrating the camera 113, and the steps shown in FIG. 4 are performed in this condition, whereby the exterior orientation parameters of the camera 113 are obtained without performing any special procedures.

2. Second Embodiment

Figure 6:
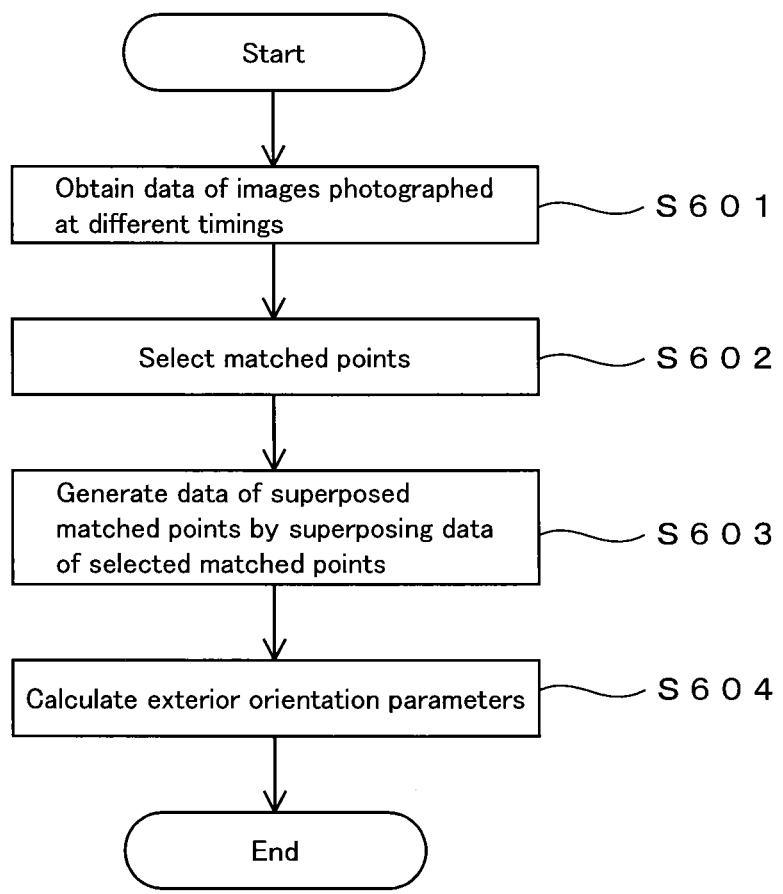
FIG. 6 is a flow chart showing an example of a processing procedure.

Another example of the processing performed by the superposition processing unit 122 will be described hereinafter. FIG. 6 shows an example of a procedure of a processing performed by the operating part 120. First, the vehicle 100 is started to travel in appropriate surroundings (for example, on the road surface 130) (see FIG. 1), and at the same time, objects, such as the building 131, are photographed by using the cameras 112 and 113 at multiple timings. This photographing is performed by synchronizing the cameras 112 and 113 so that the same objects appear in the photographed visual fields of the two cameras. In addition, the photographing should be performed so that different images are photographed at different timings. For example, moving images are photographed by synchronizing the two cameras, and image data of multiple synchronized frame images are obtained (Step S601).

FIGS. 7A to 7D show an example of a case of simultaneously performing photographing with the cameras 112 and 113 at times $t_1$, $t_2$, and $t_3$. Here, the images photographed by the camera 112 are called "reference images", and the images photographed by the camera 113 are called "comparative images". The steps until this stage are the same as in the First Embodiment.

After data of images are obtained by the cameras 112 and 113 at different timings, matched points between the image obtained by the camera 112 and the image obtained by the camera 113 at each timing are selected (Step S602). The matched points are selected by the matched point selecting unit 123 shown in FIG. 2. The method of selecting the matched points is the same as in the case of the First Embodiment.

FIGS. 7A to 7D exemplify a case in which matched points indicated by the black points ● are selected between the reference image and the comparative image at each of the times $t_1$, $t_2$, and $t_3$.

After the matched points are selected between the reference image and the comparative image at each of the times, data of superposed matched points is generated by superposing the selected matched points one on the other (Step S603). In this embodiment, this processing is performed by the superposition processing unit 122. FIG. 7D shows data in which the matched points shown in FIGS. 7A to 7C selected between the reference images and the comparative images are superposed. The matched points are selected in FIGS. 7A to 7C so that the total number of the matched points is at least six when the data of the superposed matched points is generated.

After the data of the superposed matched points of the reference images and the data of the superposed matched points of the comparative images, as shown in FIG. 7D, are obtained, the exterior orientation parameters of the camera 113 are calculated by performing the relative orientation and the scale adjustment using a predetermined scale (Step S604). This processing is performed by the exterior orientation parameter calculating unit 124. This processing is the same as the processing of the Step S404 in the First Embodiment.

3. Third Embodiment

In the First Embodiment or the Second Embodiment, if the position of the camera 113 with respect to the IMU 114 is known, but the attitude of the camera 113 is unknown, the exterior orientation parameter of the camera 113 with respect to the IMU 114 can be calculated in the same manner as in the case of the First Embodiment or the Second Embodiment.

4. Other Matters

There may be multiple cameras in which the exterior orientation parameters thereof are to be calculated. In this case, after the exterior orientation parameters of each camera are obtained, the errors may be distributed by bundle adjustment, whereby the precision of the calculated exterior orientation parameters can be increased.

Markers or targets may be used as the matched feature points. The distance between the cameras 112 and 113 may be determined by actual measurement. As a method for actually measuring the distance, a method of using, for example, laser light, the principle of triangulation, or the like, may be mentioned. For example, in a case of using the principle of triangulation, a third camera is used, in which exterior orientation parameters in the IMU coordinate system are determined, and a stereo photograph of the camera 113 is measured by using the third camera and the camera 112, whereby the position in the IMU coordinate system of the camera 113 is calculated.

The relative orientation can be performed by using one of the reference images photographed by the camera 112 and one of the comparative images photographed by the camera 113. In this case, although it depends on the objects photographed and the photographing conditions, there may possibly be a decrease in the precision of the orientation compared with the case of using the superposed images or using the data of the superposed matched points.

In recent years, technology for performing automatic driving or assisted driving of a vehicle by obtaining surrounding three-dimensional information from the vehicle has been publicly known. The present invention can also be utilized for obtaining exterior orientation parameters of an on-vehicle camera used for this technique.

The present invention can be utilized for techniques of determining exterior orientation parameters of cameras.

What is claimed is:

1. An operating device comprising:
    processing circuitry configured to
        obtain reference images by photographing an object at multiple timings with a first camera while a vehicle travels and obtain comparative image by simultaneously photographing the object at multiple timings with a second camera at the same time as the first camera while the vehicle travels, the first camera being fixed to the vehicle and having exterior orientation parameters with respect to the vehicle, which are predetermined, and the second camera being fixed to the vehicle and having exterior orientation parameters with respect to the vehicle, which are undetermined,
        select points that match between the reference images and the comparative images,
        obtain data of superposed matched points by superposing data of the matched points between the reference images and the comparative images, which are simultaneously photographed at the multiple timings,
        perform relative orientation based on the data of the superposed matched points and calculate the exterior orientation parameters of the second camera by adjusting the scale in accordance with a predetermined scale.

2. The operating device according to claim 1, wherein the multiple reference images are obtained by photographing different objects.

* * * * *